(12) United States Patent
Fukuoka et al.

(10) Patent No.: US 8,896,294 B2
(45) Date of Patent: Nov. 25, 2014

(54) MAGNETIC POSITION DETECTOR

(75) Inventors: Seiji Fukuoka, Tokyo (JP); Toshinao Kido, Tokyo (JP); Keiji Suzuki, Tokyo (JP); Ryoichi Menju, Tokyo (JP)

(73) Assignee: TDK Corporation, Tokyo (JP)

( * ) Notice: Subject to any disclaimer, the term of this patent is extended or adjusted under 35 U.S.C. 154(b) by 812 days.

(21) Appl. No.: 12/954,951

(22) Filed: Nov. 29, 2010

(65) Prior Publication Data

US 2011/0133724 A1 Jun. 9, 2011

(30) Foreign Application Priority Data

Dec. 3, 2009 (JP) ................................. 2009-275742
Jul. 6, 2010 (JP) ................................. 2010-153831

(51) Int. Cl.
*G01R 33/06* (2006.01)
*G01D 5/245* (2006.01)

(52) U.S. Cl.
CPC .................................. *G01D 5/2454* (2013.01)
USPC ..................................................... 324/207.2

(58) Field of Classification Search
USPC ......................... 324/249, 200, 207.11–207.26
See application file for complete search history.

(56) References Cited

U.S. PATENT DOCUMENTS

| 4,677,378 | A | 6/1987 | Tokura et al. |
|---|---|---|---|
| 6,147,487 | A | 11/2000 | Sugitani |
| 7,911,107 | B2 | 3/2011 | Nashiki |
| 8,314,609 | B2 * | 11/2012 | Antraygue ................. 324/207.2 |
| 2007/0182406 | A1 | 8/2007 | Yarimizu et al. |
| 2008/0265877 | A1 | 10/2008 | Kato et al. |
| 2009/0001970 | A1 | 1/2009 | Tokunaga |
| 2009/0039875 | A1 | 2/2009 | Hoshino |
| 2009/0091312 | A1 | 4/2009 | Ito et al. |
| 2009/0315544 | A1 * | 12/2009 | Takahashi et al. ........ 324/207.25 |

FOREIGN PATENT DOCUMENTS

| CN | 1900732 A | 1/2007 |
|---|---|---|
| CN | 101156047 A | 4/2008 |
| CN | 101375132 A | 2/2009 |
| DE | 10 2005 051 067 A1 | 5/2006 |
| DE | 10 2007 021 231 A1 | 11/2007 |
| JP | 60-119413 A | 6/1985 |
| JP | 61-180109 A | 8/1986 |
| JP | 6-194112 A | 7/1994 |
| JP | 2001-141514 A | 5/2001 |
| JP | 2003-106866 A | 4/2003 |
| JP | 2006-23179 A | 1/2006 |
| WO | WO 2008/095595 A2 | 8/2008 |
| WO | WO 2009/031557 A1 | 3/2009 |

OTHER PUBLICATIONS

European Patent Office, Extended European Search Report and Office Action in European Patent Application No. 10 01 5094.5 (Oct. 15, 2013).

* cited by examiner

*Primary Examiner* — Melissa Koval
*Assistant Examiner* — Trung Nguyen
(74) *Attorney, Agent, or Firm* — Leydig, Voit & Mayer, Ltd.

(57) ABSTRACT

Magnetic members are arranged along a straight line and can be placed face-to-face with spin-valve magnetoresistive elements. The magnetic pole faces of the magnetic members which can be face-to-face with the spin-valve magnetoresistive elements have different magnetic polarities from the magnetic pole faces of neighboring magnetic members. The magnetic members are arranged at a uniform pitch. Each magnetic member is spaced from neighboring magnetic members. X/P is from 40% to 60%, where X is length of each magnetic member along an arrangement direction of the magnetic members, and P is pitch of the magnetic members along the arrangement direction.

18 Claims, 12 Drawing Sheets

First embodiment (Arrows show magnetization directions.)

Stroke length 20mm (Sequential arrangement)

(Separated arrangement)

Stroke length 40mm (Sequential arrangement)

(Separated arrangement)

Stroke length 60mm (Sequential arrangement)

(Separated arrangement)

Stroke length 80mm (Sequential arrangement)

(Separated arrangement)

Second embodiment

Third embodiment

Fourth embodiment

MAGNETIC POSITION DETECTOR

BACKGROUND OF THE INVENTION

1. Field of the Invention

The present invention relates to a magnetic position detector utilizing magnetic sensors, and in particular, relates to a magnetic position detector favorably used for a magnetic scale, a magnetic rotary encoder, and so on.

2. Description of the Related Art

As shown in FIG. 14, a magnetic position detector according to the related art includes magnetic member 801 and four spin-valve type magnetoresistive elements (SV-GMR1 to SV-GMR4). The magnetic member 801 is magnetized so that it alternately has north and south magnetic poles on its surface, and the SV-GMR1 to SV-GMR4 are at the same location with respect to an arrangement direction of magnetic poles of the magnetic member 801 (see the patent document, Japanese Patent Application Laid-Open No. 2006-23179). Magnetization directions of pinned layers (fixed magnetization layers) of one pair of the SV-GMR1 and the SV-GMR2 shift by 90 degrees from each other. Magnetization directions of pinned layers of the other pair of the SV-GMR3 and SV-GMR4 shift by 180 degrees from the one pair. Two-phase output signals (see FIG. 1B) whose phases shift by 90 degrees from each other are generated by a circuit with SV-GMR1 to SV-GMR4 moving in relation to the magnetic member 801, according to magnetic characteristic of a spin-valve type magnetoresistive element explained below.

As shown in FIG. 15A, a spin-valve type magnetoresistive element, for example a spin-valve giant magnetoresistive element (SV-GMR) includes a ferromagnetic pinned layer whose magnetization direction is fixed to one direction, a nonmagnetic layer through which electric current mainly passes, and a ferromagnetic free layer whose magnetization direction is same as a direction of an external magnetic field (external magnetic flux). When a magnetization direction of the pinned layer is same as a direction of an external magnetic field, resistance of the SV-GMR is low (low-resistance state "a" shown in FIG. 15B). As a direction of an external magnetic field rotates in a magnetic sensing surface of the SV-GMR, resistance of the SV-GMR changes according to an angle between the direction of the external magnetic field and the magnetization direction of the pinned layer. When the angle is 90 degrees, the external magnetic field causes no change in resistance so that the SV-GMR is middle-resistance state "b" shown in FIG. 15B. When the direction of the external magnetic field is opposed to the magnetization direction of the pinned layer, the SV-GMR is high-resistance state "c" shown in FIG. 15B.

FIG. 15C shows a magnetic characteristic in a magnetic sensing surface of the SV-GMR. The magnetic characteristic is shown as a relation of a resistance-change rate ($\Delta R/R$) of the SV-GMR to an angle between a direction of an external magnetic field and a magnetization direction of a pinned layer, when the external magnetic field rotates around an axis perpendicular to the magnetic sensing surface (a plane which a free layer is in) of the SV-GMR. In this case, resistance-change rate ($\Delta R/R$) changes sinusoidally.

In the magnetic position detector of the above patent document, a magnetic member is such that neighboring north and south magnetic poles have no space therebetween. The inventors have come to find a problem that in this case, as explained later in detail, a difference between a magnetic field in a stroke range of a magnetic sensor relative to the magnetic members and an ideal rotating magnetic field is large, so that accuracy of detection is not good.

SUMMARY OF THE INVENTION

The present invention has been made in view of the foregoing circumstances and problems, and an object thereof is to provide a magnetic position detector whose accuracy of detection is good compared to a case where neighboring magnetic members have no space therebetween.

In a first aspect of the present invention, a magnetic position detector includes a magnetic sensor and a plurality of arranged magnetic members whose magnetic pole faces are face to face with the magnetic sensor. In the magnetic position detector, the magnetic pole faces which can be face to face with the magnetic sensor have different magnetic polarities from neighboring magnetic pole faces, and each magnetic member is separate from neighboring magnetic member.

In a second aspect of the present invention, a magnetic position detector includes a magnetic sensor, a pair of soft magnetic parts, and a plurality of arranged magnetic members whose magnetic pole faces are face to face with the magnetic sensor. In the magnetic position detector, the magnetic pole faces which can be face to face with the magnetic sensor have different magnetic polarities from neighboring magnetic pole faces, and each magnetic member is separate from neighboring magnetic member; and the magnetic members are between the pair of soft magnetic parts, which are separate from neighboring magnetic members and are magnetically connected to each other.

In the magnetic position detector according to the first or second aspects, the magnetic members may be arranged in equal pitch.

In the magnetic position detector according to the first or second aspects, the magnetic members may be rare-earth magnets.

The magnetic position detector according to the first or second aspects may include at least one pair of magnetic sensors so that a relative position of the magnetic members and the magnetic sensors can be uniquely identified.

In the magnetic position detector according to the first or second aspects, the magnetic members may be arranged straight or circularly.

In the magnetic position detector according to the first or second aspects, X/P may be from 40% to 60%, the X is length of each magnetic member along an arrangement direction, and the P is arrangement pitch of the magnetic members.

In the magnetic position detector according to the first or second aspects, a magnetic field may be from 200 Oe to 700 Oe in a stroke range of the magnetic sensor relative to the magnetic members.

In the magnetic position detector according to the first or second aspects, the magnetic sensor may include at least two hall elements. The magnetic position detector may include a magnetic yoke placed for at least one of the hall elements, so that the magnetic yoke acts in such a manner that lines of magnetic force at a magnetic sensing surface of the hall element curve toward a direction perpendicular to the magnetic sensing surface thereof when an external magnetic field in a predetermined direction parallel to the magnetic sensing surface is applied.

In the magnetic position detector according to the first or second aspects, the magnetic sensor may include first to fourth hall elements whose magnetic sensing surfaces are approximately parallel to a magnetic field from the magnetic members. The magnetic position detector may include a magnetic yoke placed for the first to fourth hall elements, so that the magnetic yoke acts in such a manner that lines of magnetic force at magnetic sensing surfaces of the first and third hall elements curve toward a direction perpendicular to the magnetic sensing surfaces thereof when an external magnetic field parallel to an arrangement direction of the magnetic members is applied to the first and third hall elements, and that lines of magnetic force at magnetic sensing surfaces of the second and fourth hall elements curve toward a direction perpendicular to the magnetic sensing surfaces thereof when an external magnetic field perpendicular to the magnetic pole faces of the magnetic members is applied to the second and fourth hall elements.

In the magnetic position detector according to the first or second aspects, the magnetic sensor may include first to fourth hall elements whose magnetic sensing surfaces are approximately parallel to the magnetic pole faces of the magnetic members facing. The magnetic position detector may include a magnetic yoke placed for at least the first and third hall elements, so that the magnetic yoke acts in such a manner that lines of magnetic force at magnetic sensing surfaces of the first and third hall elements curve toward a direction perpendicular to the magnetic sensing surfaces thereof when an external magnetic field parallel to an arrangement direction of the magnetic members is applied to the first and third hall elements.

It is to be noted that any arbitrary combination of the above-described structural components as well as the expressions according to the present invention changed among a system and so forth are all effective as and encompassed by the present aspects.

According to the aspects described above, as each magnetic member is separate from neighboring magnetic member, accuracy of detection is good compared to the case where neighboring magnetic members have no space therebetween.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, the drawings in which.

DETAILED DESCRIPTION OF THE INVENTION

The invention will now be described based on the following embodiments which do not intend to limit the scope of the present invention but exemplify the invention. All of the features and the combinations thereof described in the embodiments are not necessarily essential to the invention.

First Embodiment

Figure 1A:
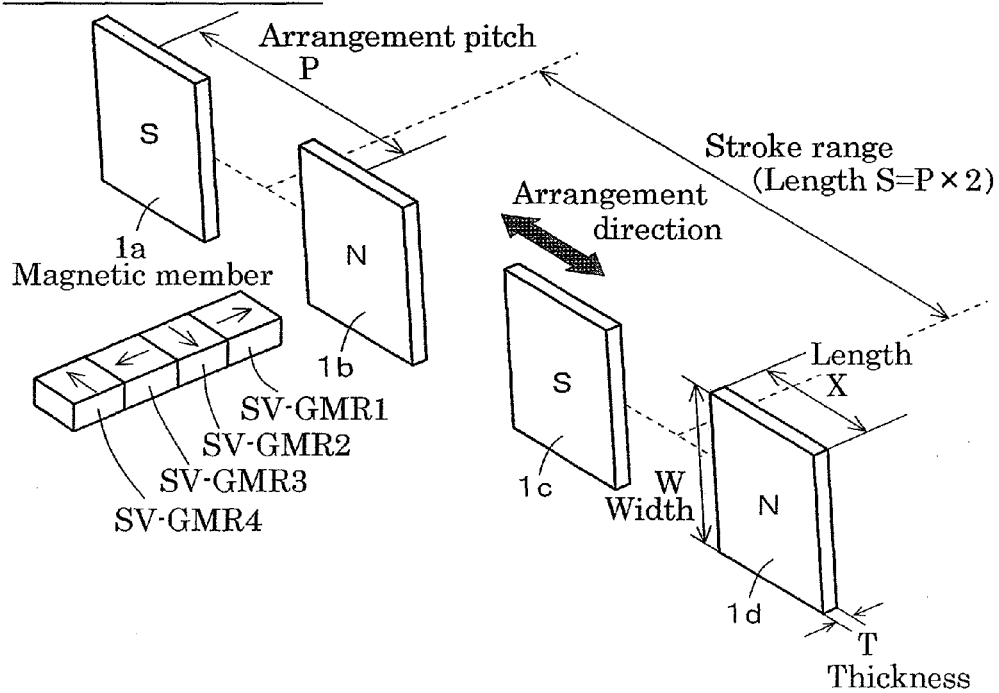
FIG. 1A is a schematic perspective view of a magnetic position detector according to a first embodiment of the present invention.
Figure 1B:
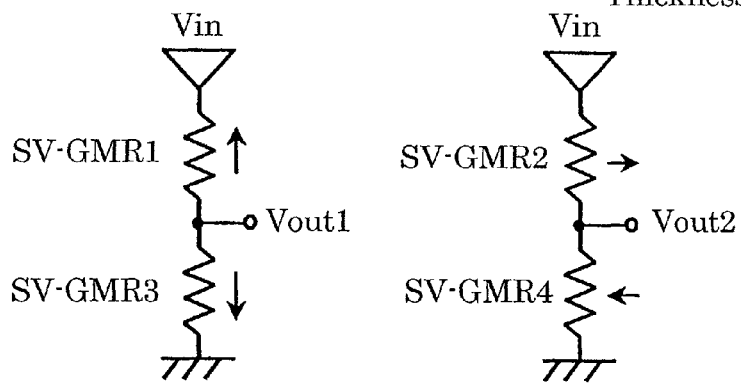
FIG. 1B is a circuit diagram showing connections of spin-valve type magnetoresistive elements of the magnetic position detector.
Figure 1C:
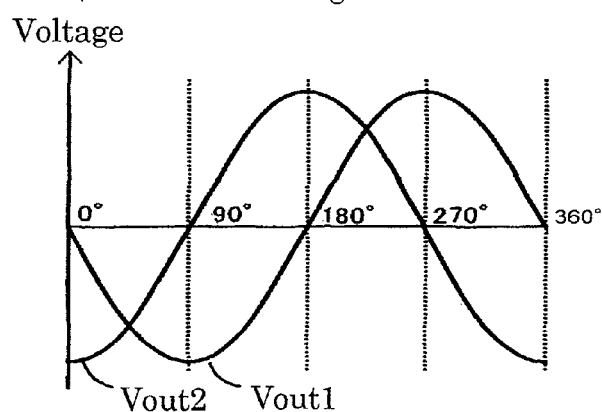
FIG. 1C is a waveform chart of output signals Vout1, Vout2 of the magnetic position detector.
Figure 2A:
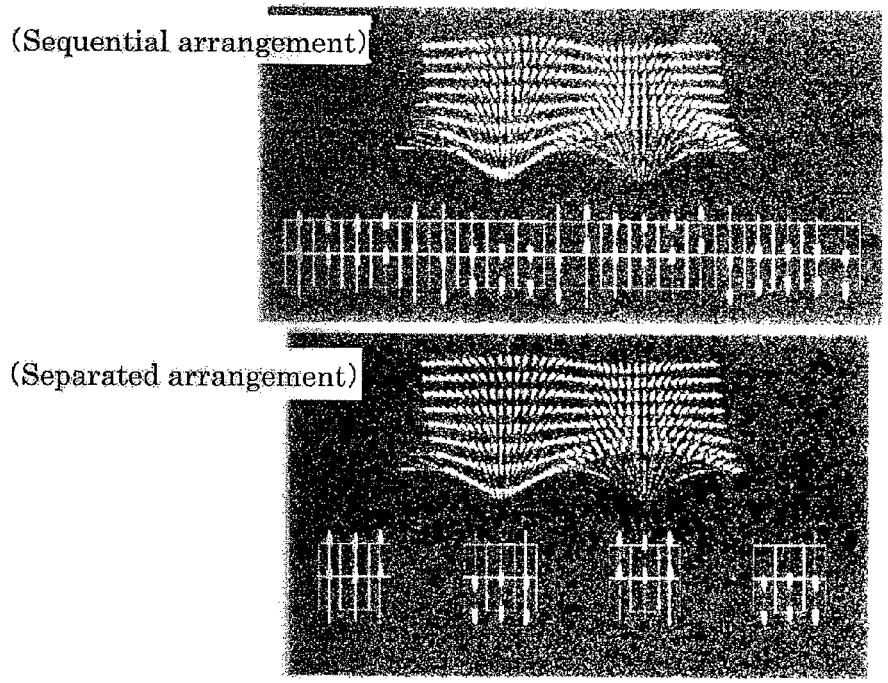
FIG. 2A is a comparative simulation diagram of magnetic fields in a relative stroke range of SV-GMR1 to SV-GMR4 in two cases, a case where magnetic members are sequentially arranged with no space therebetween and the other case where magnetic members 1a to 1d are separately arranged so that magnetic-length rate is 50%, wherein stroke length of the SV-GMR1 to SV-GMR4 relative to the magnetic members is 20 mm.
Figure 2B:
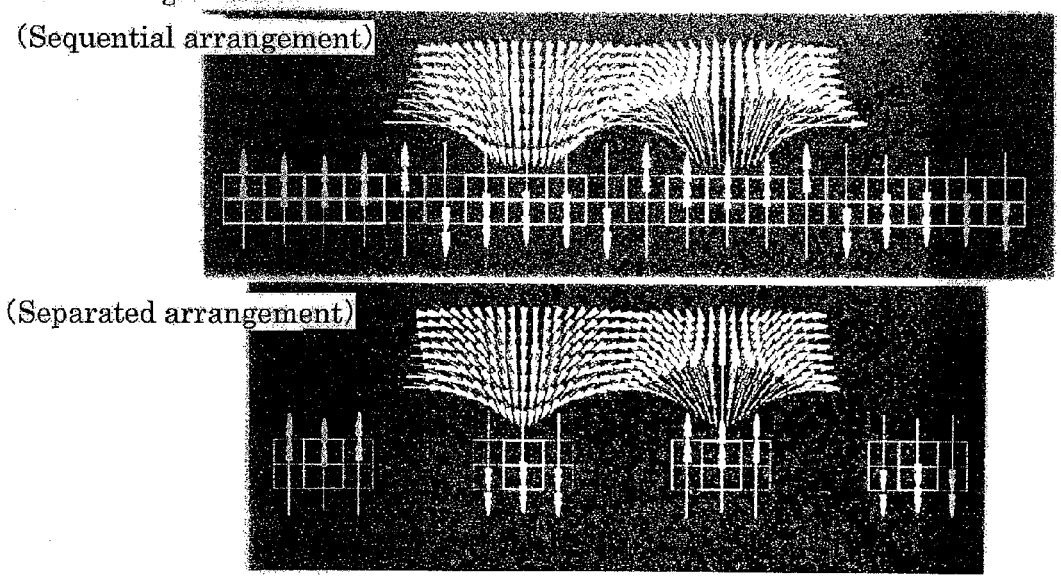
FIG. 2B is a comparative simulation diagram of magnetic fields in the two cases wherein the stroke length is 40 mm.
Figure 2C:
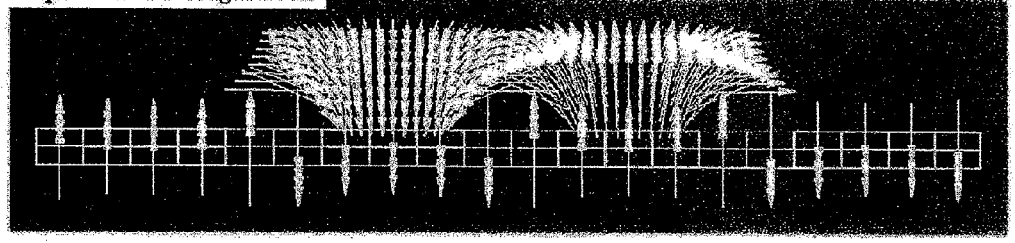
FIG. 2C is a comparative simulation diagram of magnetic fields in the two cases wherein the stroke length is 60 mm.
Figure 2C:
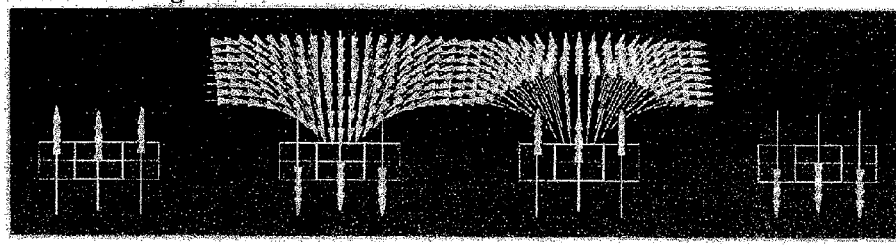
Figure 2D:
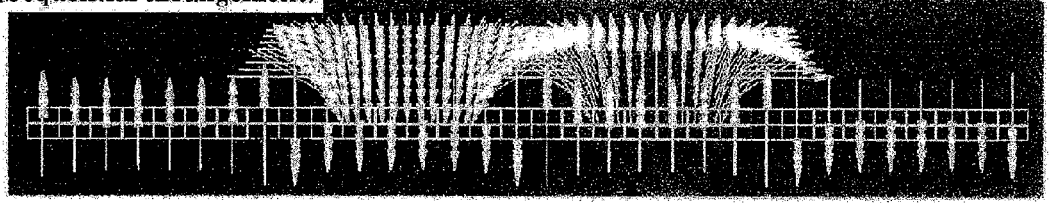
FIG. 2D is a comparative simulation diagram of magnetic fields in the two cases wherein the stroke length is 80 mm.
Figure 2D:
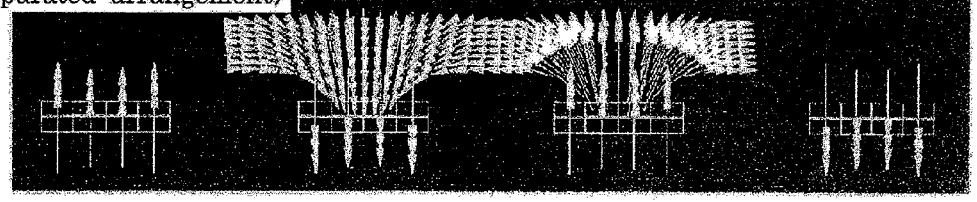

FIG. 1A is a schematic perspective view of a magnetic position detector according to a first embodiment of the present invention. FIG. 1B is a circuit diagram showing connections of spin-valve type magnetoresistive elements of the magnetic position detector. FIG. 1C is a waveform chart of output signals Vout1, Vout2 of the magnetic position detector.

As shown in FIG. 1A, the magnetic position detector includes four spin-valve giant magnetoresistive elements (SV-GMR1 to SV-GMR4) as magnetic sensors and four magnetic members 1a to 1d. Note that the SV-GMR1 to SV-GMR4 are actually tiny size though they are described big relative to the magnetic members 1a to 1d in FIG. 1A and some other figures for explicitness.

The magnetic members 1a to 1d are straight arranged so that magnetic pole faces thereof face to face with the SV-GMR1 to SV-GMR4. The magnetic pole faces which can be face to face with the SV-GMR1 to SV-GMR4 have different magnetic polarities from the neighboring magnetic pole faces. In an example of FIG. 1A, south magnetic poles of the magnetic members 1a, 1c face to face with the SV-GMR1 to SV-GMR4, north magnetic poles of the magnetic members 1b, 1d face to face with the SV-GMR1 to SV-GMR4. The magnetic members 1a to 1d are arranged in equal pitch P, and each magnetic member is separate from neighboring magnetic member. "Magnetic-length rate", which is percentage of arrangement pitch P of the magnetic members 1a to 1d accounted for by length X of each magnetic member, namely X/P, is for example 40% to 60%. Details of the magnetic-length rate are explained later.

The SV-GMR1 to SV-GMR4 are at the same location with respect to an arrangement direction the magnetic members 1a to 1d, and are connected to each other as shown in FIG. 1B. That is, the SV-GMR1 and SV-GMR3 are connected in series between a high-voltage terminal whose voltage is Vin and a low-voltage terminal, for example an earth terminal (GND). The SV-GMR2 and SV-GMR4 are connected in series between the high-voltage terminal and the low-voltage terminal. Two-phase output signals Vout1, Vout2 (based on GND) are obtained from connection point of the SV-GMR1 and SV-GMR3 and from connection point of the SV-GMR2 and SV-GMR4.

A magnetic sensing surfaces of the SV-GMR1 to SV-GMR4 are approximately parallel to a magnetic field generated by the magnetic members 1a to 1d. That is, the magnetic sensing surfaces are perpendicular to the magnetic pole faces of the magnetic members 1a to 1d and are parallel to the arrangement direction the magnetic members 1a to 1d. Magnetization directions of pinned layer of the SV-GMR1 and SV-GMR3 are perpendicular to a facing magnetic pole face of the magnetic members 1a to 1d and are directions opposite from each other. Magnetization directions of pinned layer of the SV-GMR2 and SV-GMR4 are parallel to the arrangement direction the magnetic members 1a to 1d and are directions opposite from each other. Therefore, two-phase output signals Vout1, Vout2 (shown in FIG. 1C) shifted by 90 degrees from each other are obtained from a circuit shown in FIG. 1B, along with relative movement of the SV-GMR1 to SV-GMR4 to the magnetic members 1a to 1d. And, positions of the SV-GMR1 to SV-GMR4 relative to the magnetic members 1a to 1d, namely positions of the SV-GMR1 to SV-GMR4 based on the magnetic members 1a to 1d with respect to the arrangement direction of the magnetic members 1a to 1d, are uniquely identified.

Stroke range of the SV-GMR1 to SV-GMR4 relative to the magnetic members 1a to 1d (range of relative movement along with the arrangement direction of the magnetic members 1a to 1d, namely detection range) is, as shown in FIG. 1A, from halfway between the magnetic members 1a, 1b to halfway between 1c, 1d. Center of the stroke range is halfway between the magnetic members 1b, 1c. Note that there is a relation "S=P×2" between length S of the stroke range (the length S is hereafter also referred to as "stroke length") and the arrangement pitch P of the magnetic members 1a to 1d.

Preferably a magnetic field in the stroke range of the SV-GMR1 to SV-GMR4 relative to the magnetic members 1a to 1d, namely a magnetic field passing the magnetic sensing surfaces of the SV-GMR1 to SV-GMR4, is from 200 Oe to 700 Oe so that the SV-GMR1 to SV-GMR4 can certainly work correctly. Note that there is a relation "Oe=(1000/4π) [A/m]". In this embodiment, neighboring magnetic members are separate from each other. Therefore, though it depends on separation distance, there are some cases where it is difficult to satisfy above condition by adjusting distance between the SV-GMR1 to SV-GMR4 and the magnetic members 1a to 1d (the distance is hereafter also referred to as "air gap"), when the magnetic members 1a to 1d are ordinary ferrite magnets. In such cases, it is preferable to use rare-earth magnets, neodymium magnets or the like, as magnetic members 1a to 1d.

Hereafter, significance of separately arranging magnetic members 1a to 1d in this embodiment is explained, giving comparison example in which magnetic members are arranged with no space therebetween.

FIGS. 2A to 2D are comparative simulation diagrams of magnetic fields in a relative stroke range of SV-GMR1 to SV-GMR4 in two cases, a first case where magnetic members are sequentially arranged with no space therebetween and a second case where magnetic members 1a to 1d are separately arranged so that magnetic-length rate is 50%. Stroke length of the SV-GMR1 to SV-GMR4 relative to the magnetic members 1a to 1d is 20 mm in FIG. 2A, 40 mm in FIG. 2B, 60 mm in FIG. 2C, and 80 mm in FIG. 2D. Simulations of magnetic fields are performed in 8-pattern air gaps which satisfy the condition that a magnetic field in the relative stroke range of the SV-GMR1 to SV-GMR4 is from 200 Oe to 700 Oe. The magnetic members 1a to 1d are neodymium magnets which is 4.5 mm in thickness T and 10 mm in width W.

Figure 3:
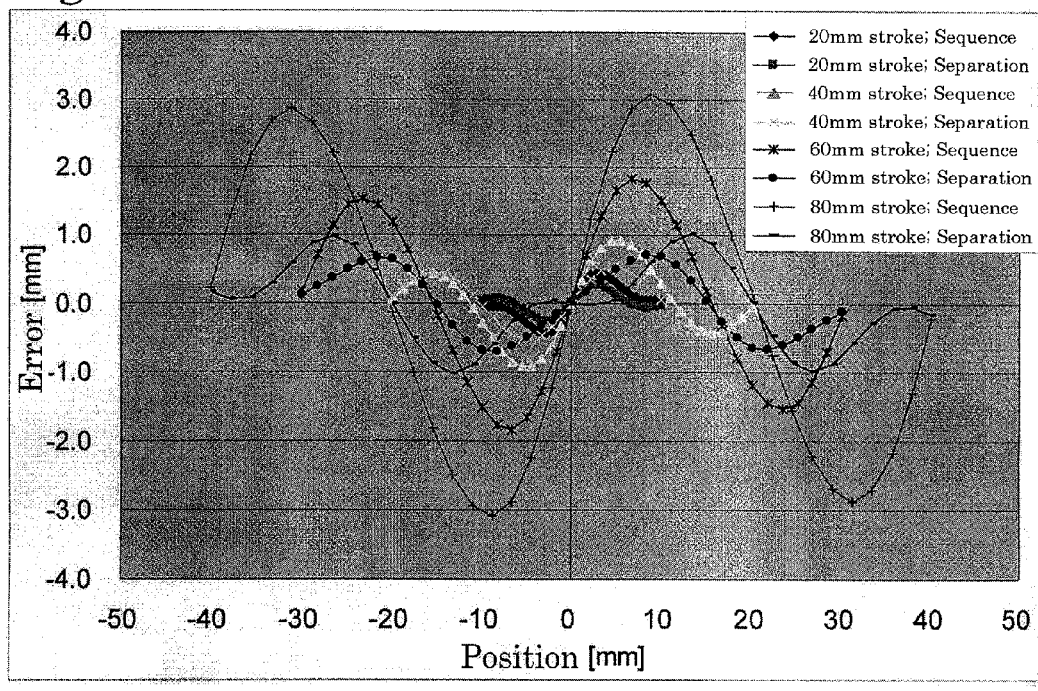
FIG. 3 shows a relation between positions of the SV-GMR1 to SV-GMR4 and errors in the two cases about each stroke length, based on results of magnetic fields simulation shown in FIGS. 2A to 2D.

FIG. 3 shows a relation between positions of the SV-GMR1 to SV-GMR4 and errors in the above two cases about each stroke length, based on results of magnetic fields simulation shown in FIGS. 2A to 2D. A base of position (0 mm in horizontal axis) is center of the stroke range. Each error shown is minimum one (most accurate one) in 8-pattern air gaps.

Figure 4:
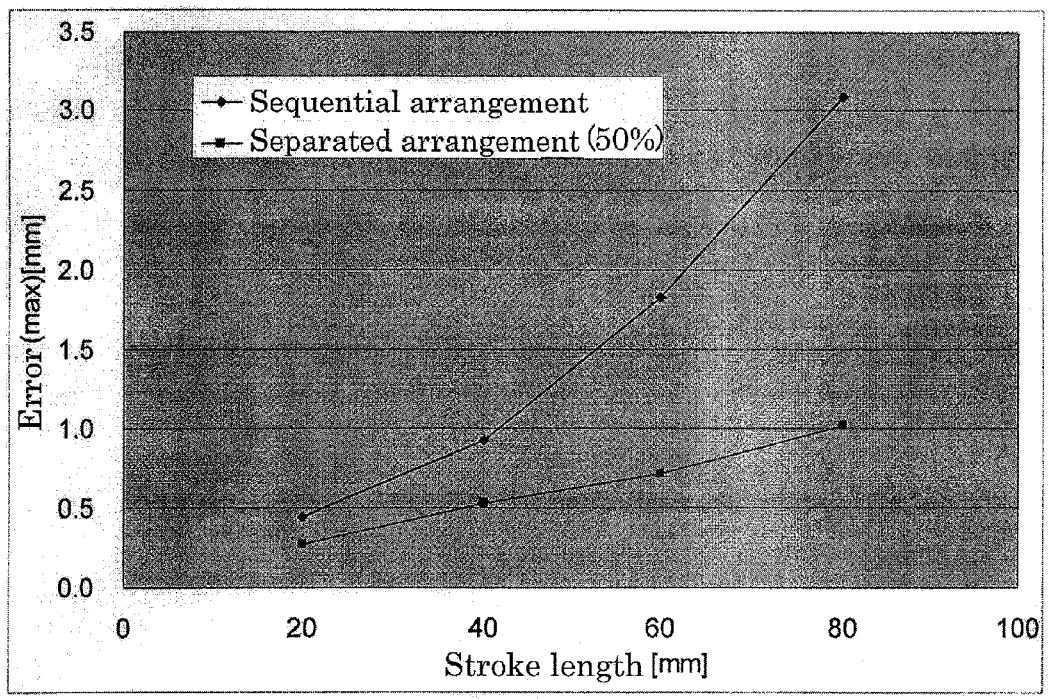
FIG. 4 shows a relation between the stroke lengths of the SV-GMR1 to SV-GMR4 relative to the magnetic members 1a to 1d and maximum errors in FIG. 3, in the two cases.
Figure 5:
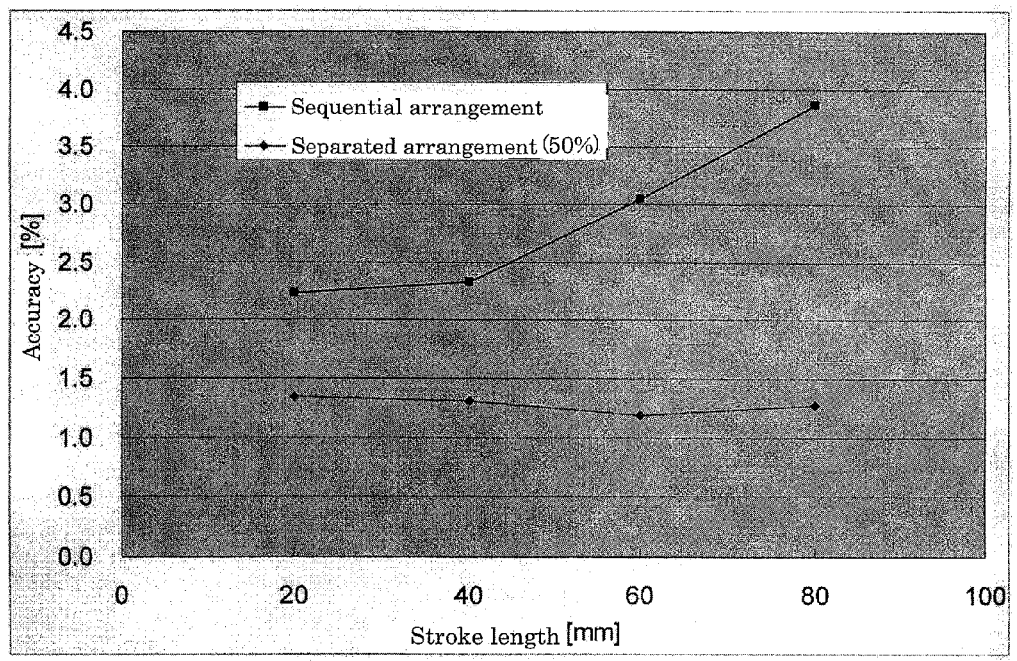
FIG. 5 shows a relation between the stroke lengths of the SV-GMR1 to SV-GMR4 and detection accuracy (maximum errors divided by the stroke lengths) in the two cases.

FIG. 4 shows a relation between the stroke lengths of the SV-GMR1 to SV-GMR4 relative to the magnetic members 1a to 1d and maximum errors in FIG. 3, in the above two cases. FIG. 5 shows a relation between the stroke lengths of the SV-GMR1 to SV-GMR4 and detection accuracy (maximum errors divided by the stroke lengths) in the above two cases.

As shown in FIG. 2A to FIG. 5, errors are smaller (namely accuracy is better) in the second case than in the first case in every stroke length. As shown in FIG. 5, in the first case, the longer the stroke length becomes, the worse the accuracy becomes. On the other hand, accuracy in the second case remains high when the stroke length becomes long. This is probably because, in the first case, a magnetic field changes like a rectangular wave in the stroke range rather than like an ideal rotating magnetic field (a magnetic field changing sinusoidally), especially when the stroke length is long (namely the length of the magnetic members are long). On the other hand, in the second case in this embodiment, the magnetic members 1a to 1d are separately arranged, so that a magnetic field changes nearly like an ideal rotating magnetic field in the stroke range compared to the first case, which can make error small as above explained.

A relation between magnetic-length rate and error is explained below.

Figure 6:
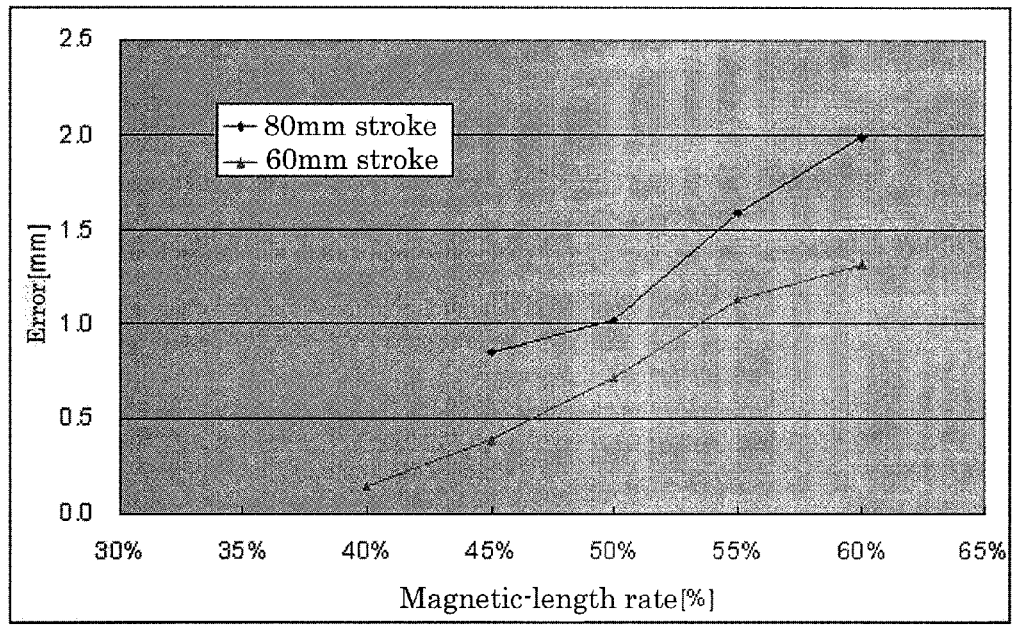
FIG. 6 shows a relation between magnetic-length rates and the maximum errors in the cases where the stroke lengths of the SV-GMR1 to SV-GMR4 relative to the magnetic members 1a to 1d are 60 mm and 80 mm.

FIG. 6 shows a relation between magnetic-length rates and maximum errors in the cases where the stroke lengths of the SV-GMR1 to SV-GMR4 relative to the magnetic members 1a to 1d are 60 mm and 80 mm. When the stroke length is 60 mm and the magnetic-length rate is from 60% to 40%, the lower the magnetic-length rate becomes, the smaller the error becomes. When the stroke length is 80 mm and the magnetic-length rate is from 60% to 45%, the lower the magnetic-length rate becomes, the smaller the error becomes. Though it is preferable that the magnetic-length rate is low because magnets can be small, condition of magnetic field strength, namely the condition that a magnetic field in the relative stroke range of the SV-GMR1 to SV-GMR4 is from 200 Oe to 700 Oe, should be considered. Therefore, a preferable range of the magnetic-length rate is from 40% or 45% to 60%.

As a result of the embodiment of the present invention, the following effects can be obtained.

(1) As the magnetic members 1a to 1d are separately arranged, compared with the case of sequential arrangement like the related art, a magnetic field in the relative stroke range of the SV-GMR1 to SV-GMR4 is nearly an ideal rotating magnetic field, so that an error of detection is small and detection accuracy is good.

(2) When the stroke lengths are the same, the magnetic members 1a to 1d can be small compared with the case of sequential arrangement. Therefore a low-cost magnetic position detector can be obtained.

(3) Using rare-earth magnets, neodymium magnets or the like, as magnetic members 1a to 1d, the condition that a magnetic field in the relative stroke range of the SV-GMR1 to SV-GMR4 is from 200 Oe to 700 Oe can be easily satisfied even in the case where the magnetic members 1a to 1d are separately arranged.

Second Embodiment

Figure 7:
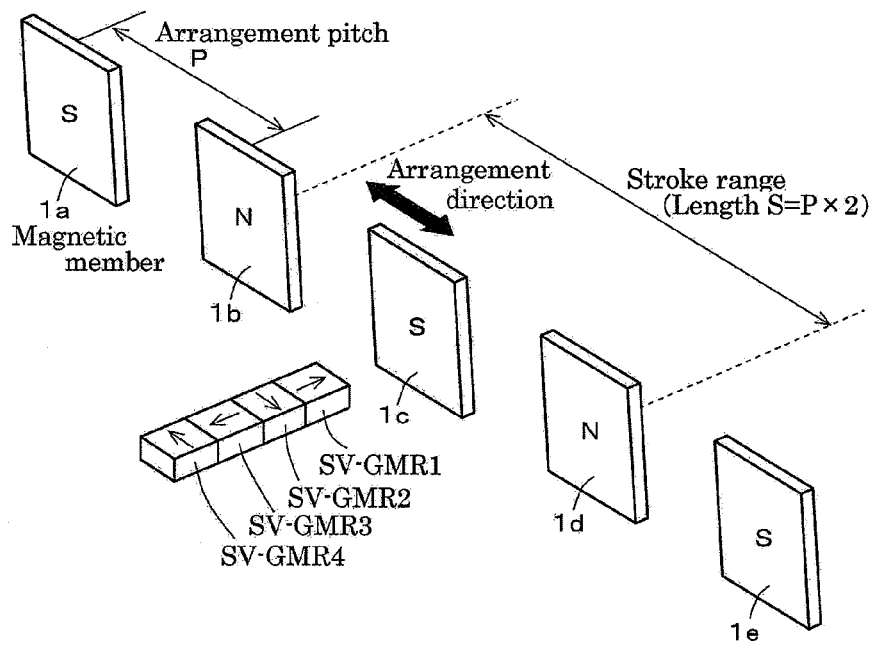
FIG. 7 is a schematic perspective view of a magnetic position detector according to a second embodiment of the present invention.
Figure 8:
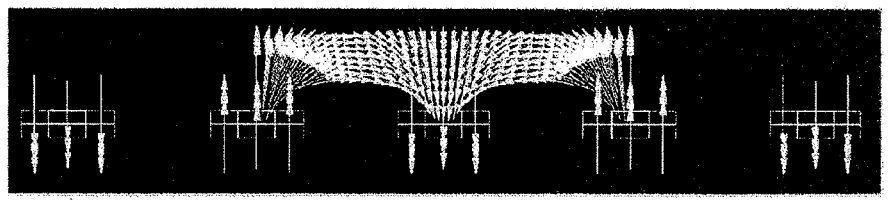
FIG. 8 shows a result of magnetic field simulation in a relative stroke range of SV-GMR1 to SV-GMR4, in a case where magnetic members 1a to 1e are separately arranged so that magnetic-length rate is 50%, in the magnetic position detector according to the second embodiment.

FIG. 7 is a schematic perspective view of a magnetic position detector according to a second embodiment of the present invention. In this embodiment, compared with the first embodiment, a magnetic member 1e is added, relative stroke range of the SV-GMR1 to SV-GMR4 is from center of the magnetic member 1b to center of the magnetic member 1d, and center of the magnetic member 1c is center of the stroke range. FIG. 8 shows a result of magnetic field simulation in a relative stroke range of the SV-GMR1 to SV-GMR4, in the case where magnetic members 1a to 1e are separately arranged so that magnetic-length rate is 50%. The stroke length of the SV-GMR1 to SV-GMR4 relative to the magnetic members 1a to 1e is 60 mm in FIG. 8. According to this embodiment, the same effects can be obtained as the first embodiment.

Third Embodiment

Figure 9:
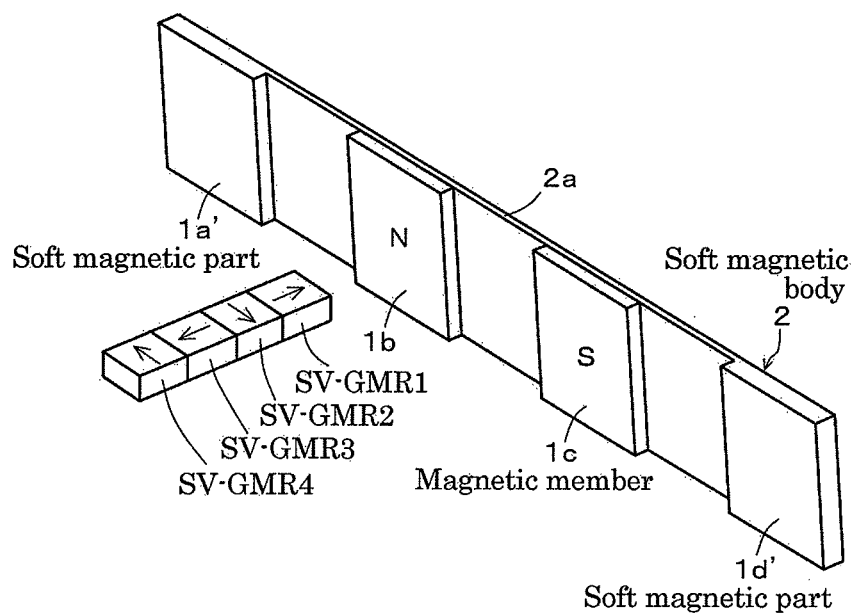
FIG. 9 is a schematic perspective view of a magnetic position detector according to a third embodiment of the present invention.

FIG. 9 is a schematic perspective view of a magnetic position detector according to a third embodiment of the present invention. In this embodiment, compared with the first embodiment, magnetic members 1a, 1d are replaced with soft magnetic parts 1a', 1d', and the soft magnetic parts 1a', 1d' are magnetically connected to each other. FIG. 9 shows a case where the soft magnetic parts 1a', 1d' are parts of a soft magnetic body 2. That is, the soft magnetic body 2 includes a plate-shape connecting part 2a, and the soft magnetic parts 1a', 1d' standing up from and connected to each other by the plate-shape connecting part 2a.

Figure 10:
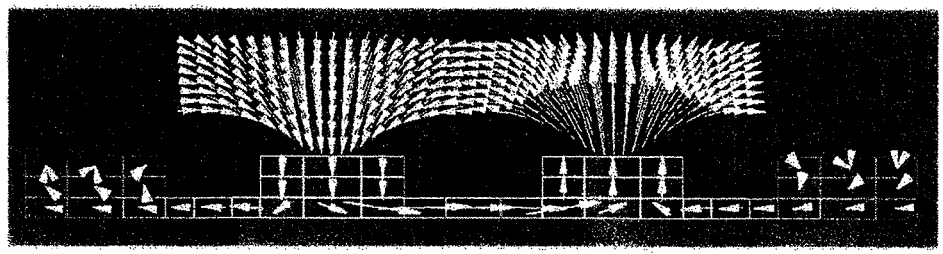
FIG. 10 shows a result of magnetic field simulation in a relative stroke range of SV-GMR1 to SV-GMR4, in a case where soft magnetic parts 1a', 1d' and magnetic members 1b, 1c are separately arranged so that magnetic-length rate is 50%, in the magnetic position detector according to the third embodiment.

FIG. 10 shows a result of magnetic field simulation in a relative stroke range of SV-GMR1 to SV-GMR4, in a case where the soft magnetic parts 1a', 1d' and the magnetic members 1b, 1c are separately arranged so that magnetic-length rate is 50%. The stroke length of the SV-GMR1 to SV-GMR4 relative to the soft magnetic parts 1a', 1d' and the magnetic members 1b, 1c is 60 mm in FIG. 10. According to this embodiment, the same effects can be obtained as the first embodiment. And, quantity of magnets can be more reduced than in the first embodiment.

Fourth Embodiment

Figure 11A:
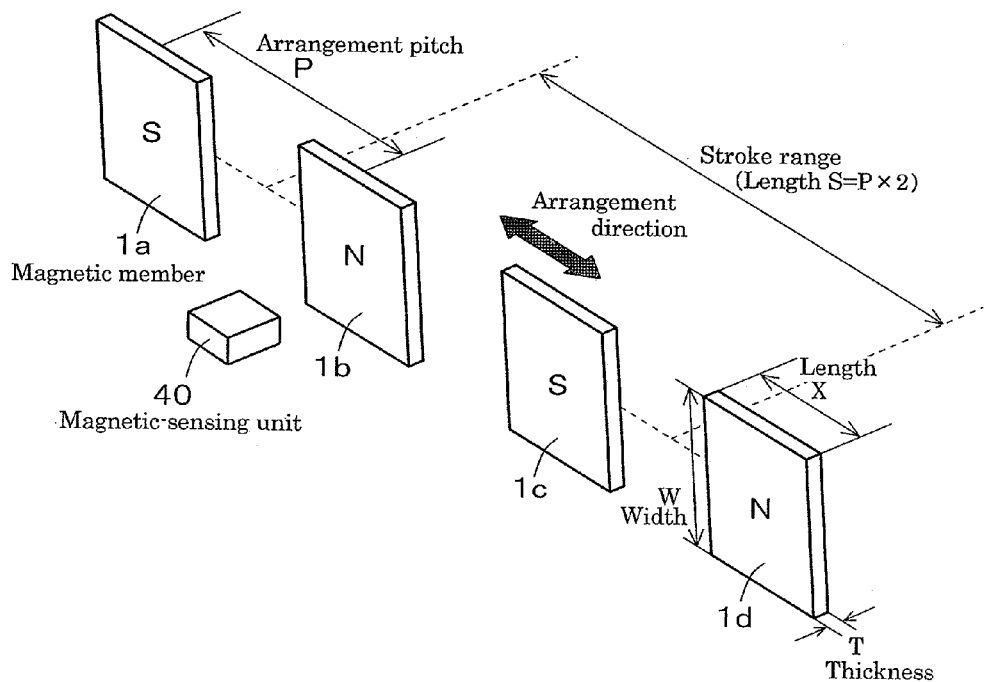
FIG. 11A is a schematic perspective view of a magnetic position detector according to a fourth embodiment of the present invention.
Figure 11B:
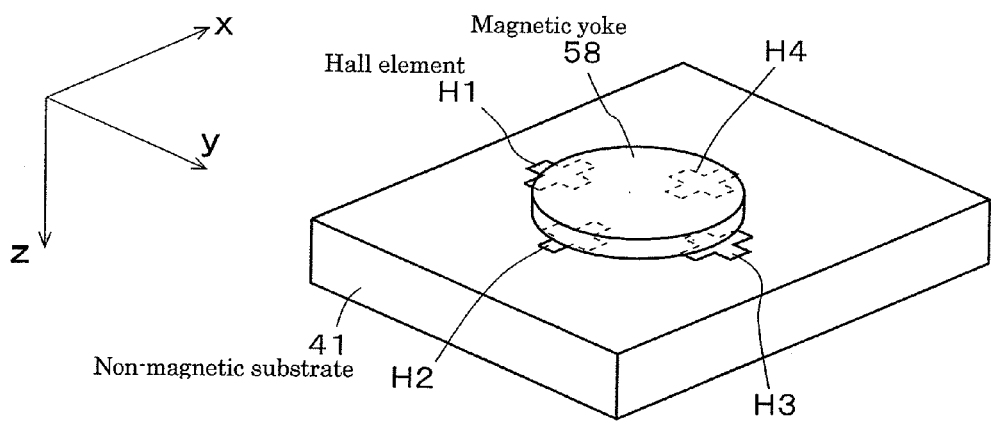
FIG. 11B is a schematic perspective view of a magnetic-sensing unit of the magnetic position detector shown in FIG. 11A.
Figure 11C:
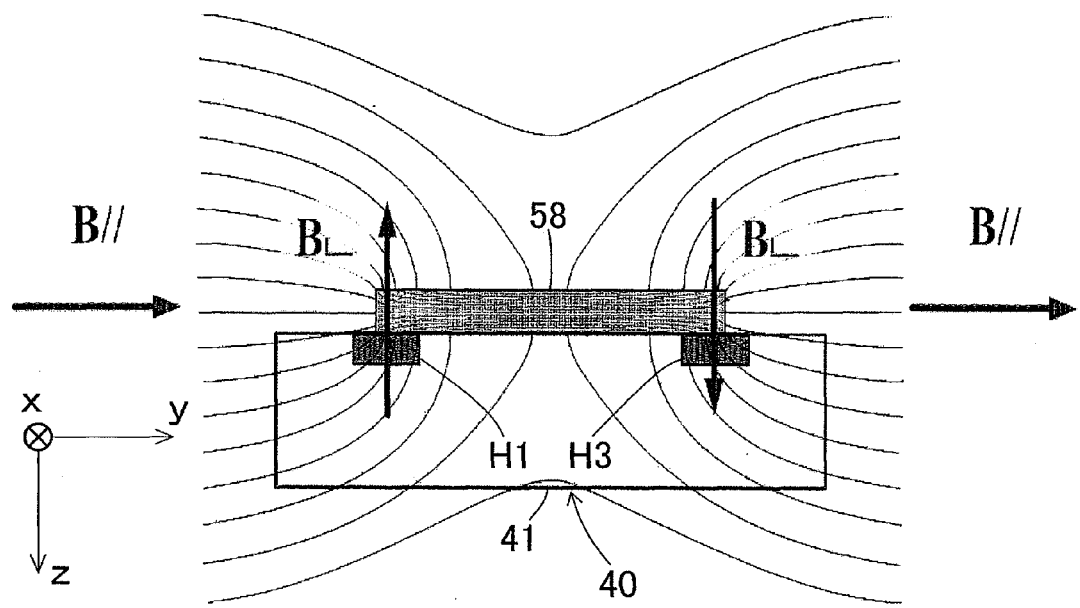
FIG. 11C is a cross section showing lines of magnetic force when y-direction magnetic field is applied to the magnetic-sensing unit shown in FIG. 11B.

In this embodiment, hall elements are used as a magnetic sensor. FIG. 11A is a schematic perspective view of a magnetic position detector according to a fourth embodiment of the present invention. FIG. 11B is a schematic perspective view of a magnetic-sensing unit 40 of the magnetic position detector shown in FIG. 11A. In FIG. 11B, three perpendicular axes are defined as x-axis, y-axis and z-axis. FIG. 11C is a cross section showing lines of magnetic force when y-direction magnetic field is applied to the magnetic-sensing unit 40 shown in FIG. 11B. In this embodiment, compared with the first embodiment, SV-GMR1 to SV-GMR4 are replaced with the magnetic-sensing unit 40. Note that the magnetic-sensing unit 40 is actually tiny size though it is described big relative to the magnetic members 1a to 1d in FIG. 11A and some other figures for explicitness.

As shown in FIG. 11B, the magnetic-sensing unit 40 includes a non-magnetic substrate 41, hall elements H1 to H4, and a magnetic yoke (soft magnetic body) 58. The hall elements H1 to H4 are mounted on the non-magnetic substrate 41. Magnetic sensing surfaces (which include semiconductor thin films in which Hall effects rise) of the hall elements H1 to H4 are parallel to a main surface of the non-magnetic substrate 41 (parallel to xy plane). The hall elements H1, H3 are at the same location with respect to x-direction. The hall elements H2, H4 are at the same location with respect to y-direction. The hall elements H1 to H4 are at the same location with respect to z-direction. The magnetic yoke 58 is circular-plate-shape and is on the non-magnetic substrate 41, lying between hall elements H1 to H4. In FIG. 11B, an outer edge of the magnetic yoke 58 is on the hall elements H1 to H4. Note that the magnetic yoke 58 may be plate-shape other than circular-plate-shape, for example square-plate-shape.

As shown in FIG. 11C, when an external magnetic field (whose magnetic flux density is B//) parallel to the y-direction is applied, owing to action of the magnetic yoke 58, lines of magnetic force at magnetic sensing surfaces of the hall elements H1, H3 curve toward z-direction. Z-component of the magnetic fields at the magnetic sensing surfaces of the hall elements H1, H3 are of the opposite direction (see $B_\perp$ in FIG. 11C). The same is true when a magnetic field parallel to the x-direction is applied. That is, when an external magnetic field parallel to the x-direction is applied, lines of magnetic force at magnetic sensing surfaces of the hall elements H2, H4 curve toward z-direction. Z-component of the magnetic fields at the magnetic sensing surfaces of the hall elements H2, H4 are of the opposite direction. On the other hand, when an external magnetic field parallel to z-direction is applied, z-component of magnetic fields at the magnetic sensing surfaces of the hall elements H1 to H4 are of the same direction. Note that in detecting a magnetic field parallel to z-direction, the magnetic yoke 58 may not be set. Therefore, the magnetic yoke 58 may not be provided for hall elements used to detect a magnetic field parallel to z-direction.

Figure 12A:
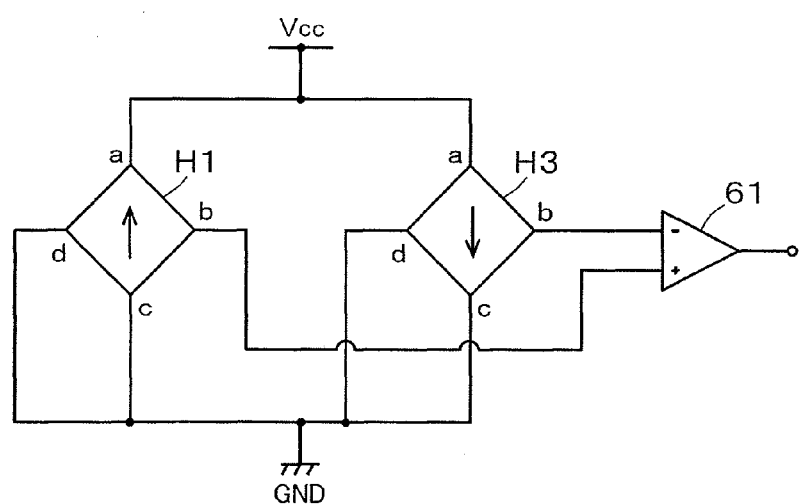
FIG. 12A is a circuit diagram showing an example of connections of hall elements to detect an external magnetic field parallel to y-direction.

FIG. 12A is a circuit diagram showing an example of connections of hall elements H1, H3 to detect an external magnetic field parallel to y-direction. In FIG. 12A, when an external magnetic field parallel to y-direction is applied, arrows in blocks of hall elements H1, H3 show directions of lines of magnetic field at the magnetic sensing surfaces in yz plane. In an example of FIG. 12A, output terminals d of the hall elements H1, H3 are common and output terminals b thereof are connected to input terminals of a differential amplifier 61. An output voltage of the differential amplifier 61 is proportional to an external magnetic field parallel to y-direction. The hall elements H2, H4, connected in the same way as the hall elements H1, H3, can detect an external magnetic field parallel to x-direction.

Figure 12B:
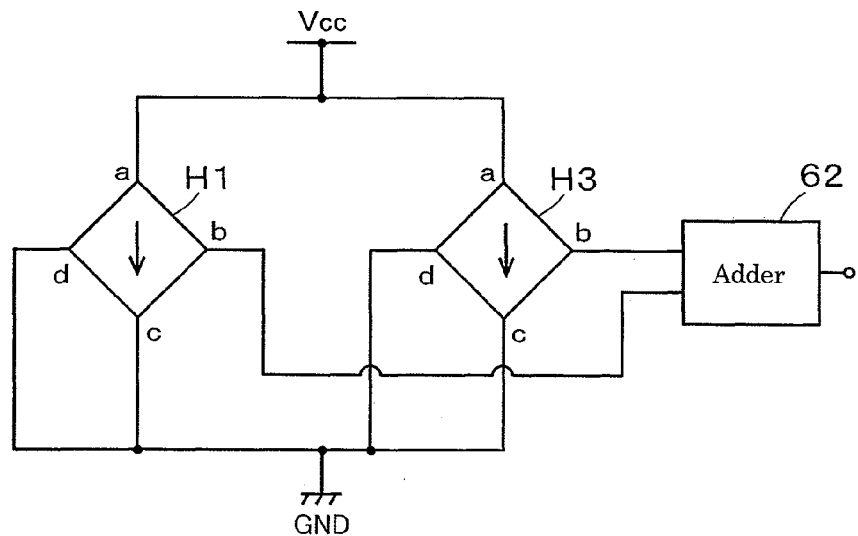
FIG. 12B is a circuit diagram showing a first example of connections of hall elements to detect an external magnetic field parallel to z-direction.
Figure 12C:
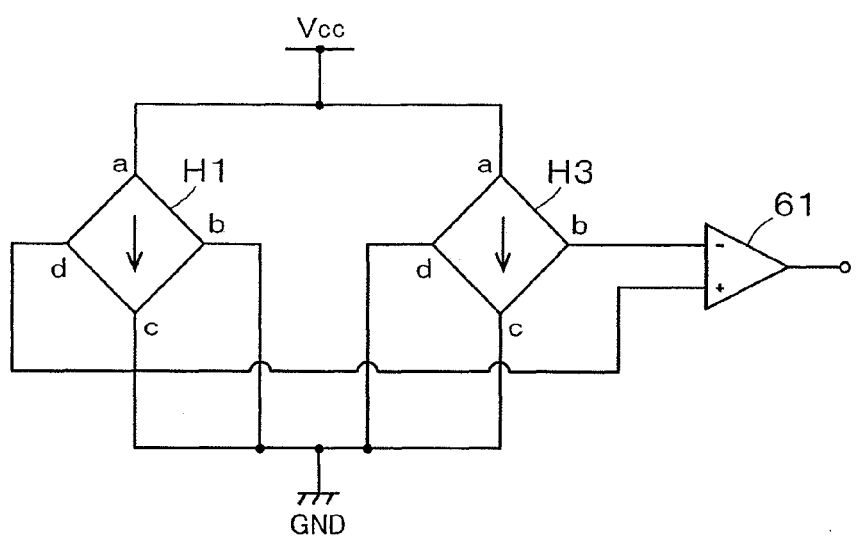
FIG. 12C is a circuit diagram showing a second example of connections of hall elements to detect an external magnetic field parallel to z-direction.

FIG. 12B is a circuit diagram showing a first example of connections of the hall elements H1, H3 to detect an external magnetic field parallel to z-direction. In FIG. 12B, when an external magnetic field parallel to z-direction is applied, arrows in blocks of hall elements H1, H3 show directions of lines of magnetic field at the magnetic sensing surfaces in yz plane. In the circuit shown in FIG. 12B, compared to the circuit shown in FIG. 12A, the differential amplifier 61 is replaced with an adder 62. The adder 62 may be an ordinary one using an operational amplifier etc. An output voltage of the adder 62 is proportional to an external magnetic field parallel to z-direction. The hall elements H2, H4, connected in the same way as the hall elements H1, H3, can detect an external magnetic field parallel to z-direction. Note that a circuit shown in FIG. 12C can similarly detect an external magnetic field parallel to z-direction. The circuit shown in FIG. 12C is such that objects to which the output terminals b, d of the hall elements H1 are connected are exchanged for each other, compared to FIG. 12A.

Figure 13A:
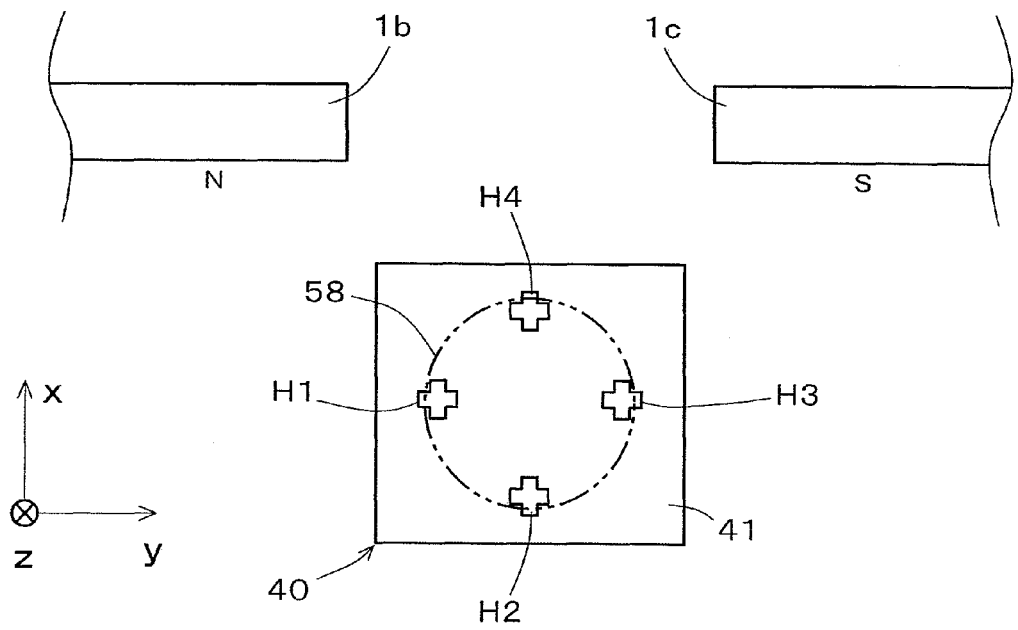
FIG. 13A shows a first example of position of the magnetic-sensing unit relative to magnetic members.

FIG. 13A shows a first example of position of the magnetic-sensing unit 40 relative to magnetic members 1a to 1d. Definitions of x-direction, y-direction and z-direction are same as FIG. 11B. In the example of FIG. 13A, the hall elements H1, H3 are to detect a magnetic field parallel to y-direction; the hall elements H2, H4 are to detect a magnetic field parallel to x-direction. A main surface of the non-magnetic substrate 41 of the magnetic-sensing unit 40 is perpendicular to magnetic pole faces of the magnetic members 1a to 1d. An arrangement direction of the hall elements H1, H3 (y-direction) is parallel to the arrangement direction of the magnetic members 1a to 1d. An arrangement direction of the hall elements H2, H4 (x-direction) is perpendicular to the magnetic pole faces of the magnetic members 1a to 1d. The hall elements H1, H3 are connected as shown in FIG. 12A to detect a magnetic field parallel to the arrangement direction of the magnetic members 1a to 1d (y-direction). The hall elements H2, H4 are connected in the same way to detect a magnetic field perpendicular to the magnetic pole faces of the magnetic members 1a to 1d (x-direction magnetic field). Two-phase output signals shifted by 90 degrees from each other (see FIG. 1C) are obtained from the hall elements H1, H3 and the hall elements H2, H4.

Figure 13B:
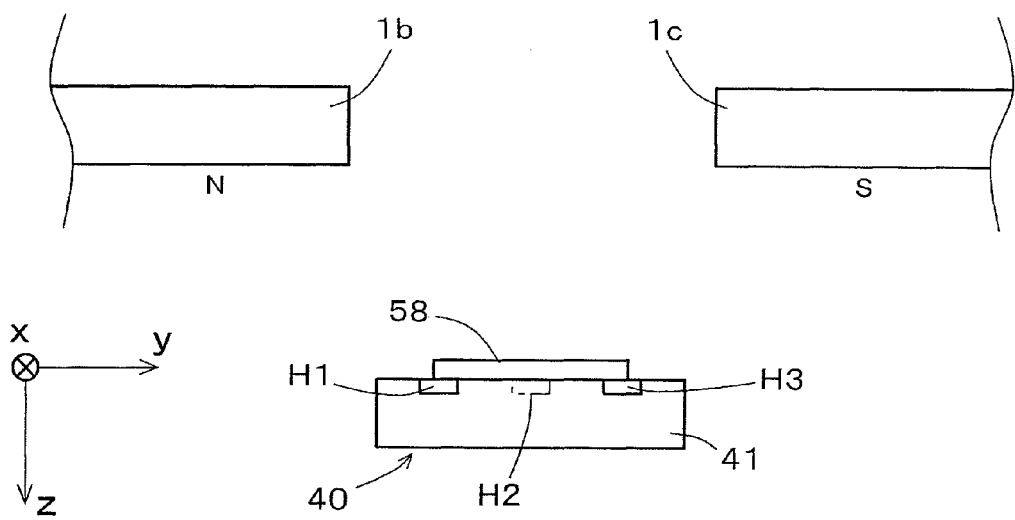
FIG. 13B shows a second example of position of the magnetic-sensing unit relative to magnetic members.
Figure 14:
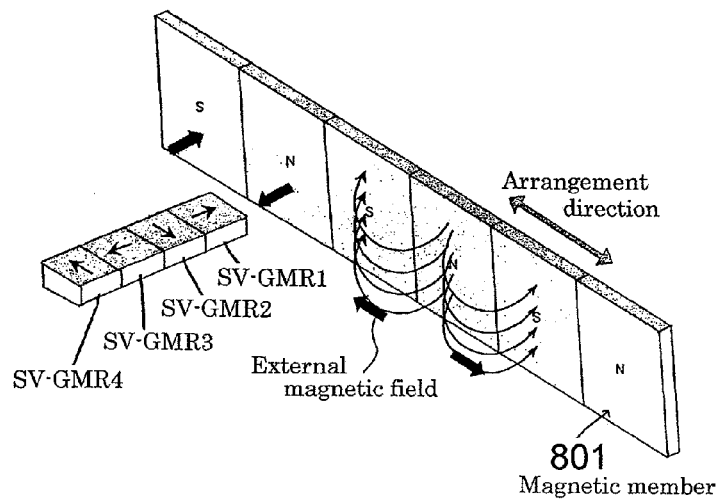
FIG. 14 is a schematic perspective view of a magnetic position detector shown in the patent document.
Figure 15A:
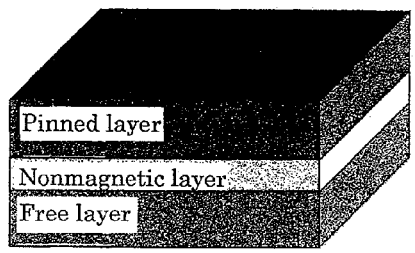
FIG. 15A is a schematic perspective view showing a film configuration of a spin-valve type magnetoresistive element.
Figure 15B:
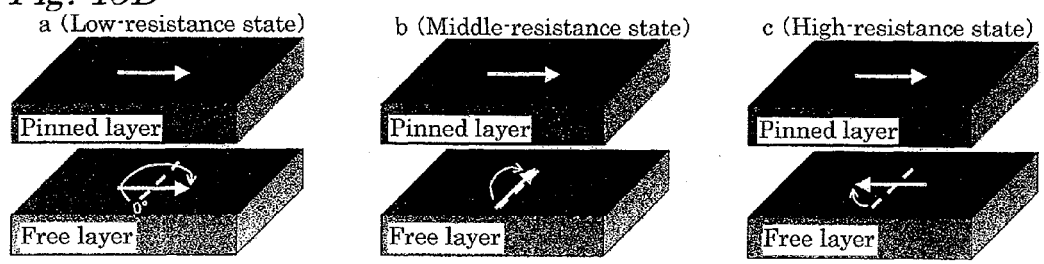
FIG. 15B shows a relation between a magnetization direction of a pinned layer and a magnetization direction of a free layer when a spin-valve type magnetoresistive element is low-resistance state, middle-resistance state and high-resistance state.
Figure 15C:
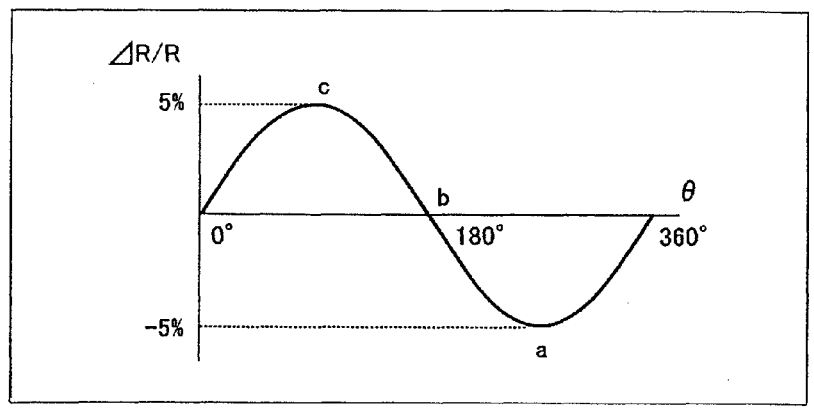
FIG. 15C is a waveform chart showing a magnetic characteristic in a magnetic sensing surface of a spin-valve type magnetoresistive element, wherein the magnetic characteristic is shown as a relation of a resistance-change rate ($\Delta R/R$) of the SV-GMR to an angle between a magnetization direction of an free layer and a magnetization direction of a pinned layer.

FIG. 13B shows a second example of position of the magnetic-sensing unit 40 relative to magnetic members 1a to 1d. Definitions of x-direction, y-direction and z-direction are same as FIG. 11B. In the example of FIG. 13B, the hall elements H1, H3 are to detect a magnetic field parallel to y-direction; the hall elements H2, H4 are to detect a magnetic field parallel to z-direction. A main surface of the non-magnetic substrate 41 of the magnetic-sensing unit 40 is parallel to magnetic pole faces of the magnetic members 1a to 1d. An arrangement direction of the hall elements H1, H3 (y-direction) is parallel to the arrangement direction of the magnetic members 1a to 1d. An arrangement direction of the hall elements H2, H4 (x-direction) is perpendicular to the arrangement direction of the magnetic members 1a to 1d and is parallel to the magnetic pole faces of the magnetic members 1a to 1d. The hall elements H1, H3 are connected as shown in FIG. 12A to detect a magnetic field parallel to the arrangement direction of the magnetic members 1a to 1d (y-direction). The hall elements H2, H4 are connected as shown in FIG. 12B to detect a magnetic field perpendicular to the magnetic pole faces of the magnetic members 1a to 1d (z-direction magnetic field). Two-phase output signals shifted by 90 degrees from each other (see FIG. 1C) are obtained from the hall elements H1, H3 and the hall elements H2, H4.

According to this embodiment, the same effects can be obtained as the first embodiment. And, using hall elements, which are less expensive than spin-valve type magnetoresistive elements, a lower-cost magnetic position detector can be obtained. Moreover, in the case of the second example of position of the magnetic-sensing unit 40 shown in FIG. 13B, as the main surface of the non-magnetic substrate 41 are parallel to the magnetic pole faces of the magnetic members 1a to 1d, distance between the hall elements H1 to H4 and the magnetic pole faces of the magnetic members 1a to 1d can be small, compared to the case where the main surface is perpendicular to the magnetic pole faces. Therefore, it is easier to apply a magnetic field needed to detect to the magnetic sensing surfaces of the hall elements H1 to H4, even if the magnetic members 1a to 1d are not rare-earth magnets but ordinary ferrite magnets.

Described above is an explanation based on the embodiment. The description of the embodiments is illustrative in nature and various variations in constituting elements and processes involved are possible. Those skilled in the art would readily appreciate that such variations are also within the scope of the present invention.

While an arrangement direction of the SV-GMR1 to SV-GMR4 are perpendicular to the magnetic pole faces of the magnetic members facing thereto in the first to third embodiments, the arrangement direction may be parallel to the magnetic pole faces (vertical superposition), or may be at a predetermined angle therewith.

While the SV-GMR1 to SV-GMR4 are located the same with respect to the arrangement direction of the magnetic members in the first to third embodiments, the locations may be such that the SV-GMR1, SV-GMR2 are separated from each other by P/2 with respect to the arrangement direction, SV-GMR3 is at the same location as SV-GMR1 with respect to the arrangement direction, and SV-GMR4 is at the same location as SV-GMR2 with respect to the arrangement direction. In this case, pinned layer magnetization directions of the SV-GMR1, SV-GMR2 are approximately perpendicular to the magnetic pole faces of the magnetic members facing thereto and are toward the magnetic members. Pinned layer magnetization directions of the SV-GMR3, SV-GMR4 are approximately perpendicular to the magnetic pole faces and are toward a side opposite the magnetic members. That is, pinned layer magnetization directions of the SV-GMR1 to SV-GMR4 are approximately perpendicular to the magnetic pole faces of the magnetic members, pinned layer magnetization directions of the SV-GMR1, SV-GMR3, which are at the same location with respect to the arrangement direction of the magnetic members, are opposite from each other, and similarly pinned layer magnetization directions of the SV-GMR2, SV-GMR4 are opposite from each other. The number of magnetic members is preferably five to six.

While the number of spin-valve type magnetoresistive elements is four in the first to third embodiments, the number thereof may be two. In this case, either of the SV-GMR1 or SV-GMR3 and either of the SV-GMR2 or SV-GMR4 are replaced by for example fixed resistors in a circuit shown in FIG. 1B. According to this modification, the same effects can be obtained as the first to third embodiments except that detection sensitivity is low compared thereto.

While spin-valve giant magnetoresistive elements are used as magnetic sensors in the first to third embodiments, spin-valve tunnel magnetoresistive elements (SV-TMR) or hall elements may be used as magnetic sensors. Note that a magnetic characteristic in a magnetic sensing surface of a SV-TMR is same as a SV-GMR, corresponding to an angle between a pinned layer magnetization direction and an external magnetic field applied. And, an output signal whose amplitude is increased compared to the case of a SV-GMR can be obtained from SV-TMR, so that detection sensitivity of magnetic field is high.

While the magnetic members 1a to 1d are arranged straight and each magnetic pole face is a plane in the first embodiment, the magnetic members 1a to 1d may be arranged along an arc or the like and each magnetic pole face may be an arc face or the like. The same is true for the other embodiments.

The number of magnetic members in the embodiments is one of the examples. The number of magnetic members is selectable from two to more. For example, magnetic members 1a, 1d may be omitted to use only two magnetic members in the first embodiment. When a stroke length may be shorter than P×2, using only two magnetic members reduces cost. Similarly, magnetic members 1a, 1e may be omitted to use only three magnetic members in the second embodiment. The number of magnetic members can be selected, considering conditions of stroke length and so on.

While the number of hall elements is four in the fourth embodiment, the number thereof may be two. In this case, either of hall elements H1 or H3 and either of hall elements H2, H4 are omitted from composition of the fourth embodiment. According to this modification, the same effects can be obtained as the fourth embodiment except that detection sensitivity is low compared thereto.

What is claimed is:

1. A magnetic position detector comprising:
   at least one pair of magnetic sensors; and
   magnetic members arranged in respective positions so that the magnetic members are spaced apart from each other along an arrangement direction, wherein
   each of the magnetic members has a magnetic pole face,
   the magnetic members can move relative to the at least one pair of magnetic sensors, in a stroke direction, along the arrangement direction, so that the magnetic pole faces of respective magnetic members are placed directly opposite and face-to-face with the at least one pair of magnetic sensors, and
   the magnetic pole faces of alternating magnetic members along the arrangement direction, and which can be placed directly opposite and face-to-face with the at least one pair of magnetic sensors, have opposite magnetic polarities, wherein position of the at least one pair of magnetic sensors relative to the magnetic members can be uniquely determined.

2. The magnetic position detector according to claim 1, comprising a pair of soft magnetic parts the magnetic members are located between the pair of soft magnetic parts, and
   the soft magnetic parts are spaced from neighboring magnetic members and are magnetically coupled to each other.

3. The magnetic position detector according to claim 2, wherein the magnetic members are spaced apart at a uniform pitch.

4. The magnetic position detector according to claim 2, wherein the magnetic members are rare-earth magnets.

5. The magnetic position detector according to claim 2, wherein the arrangement direction of the magnetic members lies along a straight line or on a circle.

6. The magnetic position detector according to claim 2, wherein
   X/P is from 40% to 60%,
   X is length of each magnetic member along the arrangement direction of the magnetic members, and
   P is arrangement pitch of the magnetic members.

7. The magnetic position detector according to claim 2, wherein magnetic field at the at least one pair of magnetic sensors is from 200 Oe to 700 Oe in a stroke range of the magnetic sensor relative to the magnetic members.

8. The magnetic position detector according to claim 2, wherein
   the at least one pair of magnetic sensors includes at least two Hall elements, and
   the magnetic position detector comprises a magnetic yoke positioned relative to at least one of the Hall elements, so that lines of magnetic force at a magnetic sensing surface of the Hall element curve toward a direction perpendicular to the magnetic sensing surface of the Hall element when an external magnetic field in a predetermined direction, parallel to the magnetic sensing surface, is applied.

9. The magnetic position detector according to claim 2, wherein
   the at least one pair of magnetic sensors includes first, second, third, and fourth Hall elements having respective magnetic sensing surfaces that are approximately parallel to a magnetic field produced by the magnetic members, and
   the magnetic position detector comprises a magnetic yoke located relative to the first, second, third, and fourth Hall elements, so that lines of magnetic force at magnetic sensing surfaces of the first and third Hall elements curve toward a direction perpendicular to the magnetic sensing surfaces of the first and third Hall elements when an external magnetic field parallel to an arrangement direction of the magnetic members is applied to the first and third Hall elements, and so that lines of magnetic force at magnetic sensing surfaces of the second and fourth Hall elements curve toward a direction perpendicular to the magnetic sensing surfaces of the second and fourth Hall elements when an external magnetic field perpendicular to the magnetic pole faces of the magnetic members is applied to the second and fourth Hall elements.

10. The magnetic position detector according to claim 2, wherein
    the magnetic sensor includes first, second, third, and fourth Hall elements having respective magnetic sensing surfaces approximately parallel to the magnetic pole faces of the magnetic members facing the magnetic sensor, and
    the magnetic position detector comprises a magnetic yoke located relative to at least the first and third Hall elements, so that lines of magnetic force at magnetic sensing surfaces of the first and third Hall elements curve toward a direction perpendicular to the magnetic sensing surfaces of the first and third Hall elements when an external magnetic field parallel to an arrangement direction of the magnetic members is applied to the first and third Hall elements.

11. The magnetic position detector according to claim 1, wherein the magnetic members are spaced apart at a uniform pitch.

12. The magnetic position detector according to claim 1, wherein the magnetic members are rare-earth magnets.

13. The magnetic position detector according to claim 1, wherein the arrangement direction of the magnetic members lies along a straight line or on a circle.

14. A magnetic position detector comprising:
a magnetic sensor; and
a plurality of magnetic members arranged in positions with respect to each other, each of the magnetic members having magnetic pole faces, wherein
the magnetic pole faces of respective magnetic members can be placed face-to-face with the magnetic sensor,
the magnetic pole faces of a magnetic member which can be placed face-to-face with the magnetic sensor have different magnetic polarities from the magnetic pole faces of neighboring magnetic members,
each magnetic member is spaced from the neighboring magnetic members,
X/P is from 40% to 60%,
X is length of each magnetic member along an arrangement direction of the magnetic members, and
P is arrangement pitch of the magnetic members.

15. A magnetic position detector comprising:
a magnetic sensor; and
a plurality of magnetic members arranged in positions with respect to each other, each of the magnetic members having magnetic pole faces, wherein
the magnetic pole faces of respective magnetic members can be placed face-to-face with the magnetic sensor,
the magnetic pole faces of a magnetic member which can be placed face-to-face with the magnetic sensor have different magnetic polarities from the magnetic pole faces of neighboring magnetic members,
each magnetic member is spaced from the neighboring magnetic members, and
magnetic field at the magnetic sensor is from 200 Oe to 700 Oe in a stroke range of the magnetic sensor relative to the magnetic members.

16. A magnetic position detector comprising:
a magnetic sensor; and
a plurality of magnetic members arranged in positions with respect to each other, each of the magnetic members having magnetic pole faces, wherein
the magnetic pole faces of respective magnetic members can be placed face-to-face with the magnetic sensor,
the magnetic pole faces of a magnetic member which can be placed face-to-face with the magnetic sensor have different magnetic polarities from the magnetic pole faces of neighboring magnetic members,
each magnetic member is spaced from the neighboring magnetic members,
the magnetic sensor includes at least two Hall elements, and
the magnetic position detector comprises a magnetic yoke positioned relative to at least one of the Hall elements, so that lines of magnetic force at a magnetic sensing surface of the Hall element curve toward a direction perpendicular to the magnetic sensing surface of the Hall element when an external magnetic field in a predetermined direction, parallel to the magnetic sensing surface, is applied.

17. A magnetic position detector comprising:
a magnetic sensor; and
a plurality of magnetic members arranged in positions with respect to each other, each of the magnetic members having magnetic pole faces, wherein
the magnetic pole faces of respective magnetic members can be placed face-to-face with the magnetic sensor,
the magnetic pole faces of a magnetic member which can be placed face-to-face with the magnetic sensor have different magnetic polarities from the magnetic pole faces of neighboring magnetic members,
each magnetic member is spaced from the neighboring magnetic members,
the magnetic sensor includes first, second, third, and fourth Hall elements having respective magnetic sensing surfaces that are approximately parallel to a magnetic field produced by the magnetic members, and
the magnetic position detector comprises a magnetic yoke located relative to the first, second, third, and fourth Hall elements, so that lines of magnetic force at magnetic sensing surfaces of the first and third Hall elements curve toward a direction perpendicular to the magnetic sensing surfaces of the first and third Hall elements when an external magnetic field parallel to an arrangement direction of the magnetic members is applied to the first and third Hall elements, and so that lines of magnetic force at magnetic sensing surfaces of the second and fourth Hall elements curve toward a direction perpendicular to the magnetic sensing surfaces of the second and fourth Hall elements when an external magnetic field perpendicular to the magnetic pole faces of the magnetic members is applied to the second and fourth Hall elements.

18. A magnetic position detector comprising:
a magnetic sensor; and
a plurality of magnetic members arranged in positions with respect to each other, each of the magnetic members having magnetic pole faces, wherein
the magnetic pole faces of respective magnetic members can be placed face-to-face with the magnetic sensor,
the magnetic pole faces of a magnetic member which can be placed face-to-face with the magnetic sensor have different magnetic polarities from the magnetic pole faces of neighboring magnetic members,
each magnetic member is spaced from the neighboring magnetic members,
the magnetic sensor includes first, second, third, and fourth Hall elements having respective magnetic sensing surfaces approximately parallel to the magnetic pole faces of the magnetic members facing the magnetic sensor, and
the magnetic position detector comprises a magnetic yoke located relative to at least the first and third Hall elements, so that lines of magnetic force at magnetic sensing surfaces of the first and third Hall elements curve toward a direction perpendicular to the magnetic sensing surfaces of the first and third Hall elements when an external magnetic field parallel to an arrangement direction of the magnetic members is applied to the first and third Hall elements.

* * * * *